United States Patent [19]
Eddy

[11] Patent Number: 6,072,654
[45] Date of Patent: Jun. 6, 2000

[54] FREQUENCY DOMAIN HEAD LINEARIZATION

[75] Inventor: Kyle Kenneth Eddy, Bloomington, Minn.

[73] Assignee: Seagate Technology, Inc., Scotts Valley, Calif.

[21] Appl. No.: 08/900,186

[22] Filed: Jul. 25, 1997

Related U.S. Application Data

[60] Provisional application No. 60/029,064, Oct. 22, 1996.

[51] Int. Cl.[7] .................................................. G11B 5/596
[52] U.S. Cl. .................................. 360/77.04; 360/78.09; 318/560; 318/561; 318/568.22
[58] Field of Search ................................ 360/77.04, 78.09, 360/75, 77.05, 77.08, 78.04, 78.07, 23; 318/560, 561, 568.22

[56] References Cited

U.S. PATENT DOCUMENTS

| | | | |
|---|---|---|---|
| 4,786,990 | 11/1988 | Overton et al. | 360/65 |
| 4,954,905 | 9/1990 | Wakabashi et al. | 360/77.03 |
| 5,155,422 | 10/1992 | Sidman et al. | 318/560 |
| 5,369,345 | 11/1994 | Phan et al. | 318/561 |
| 5,404,255 | 4/1995 | Kobayashi et al. | 360/78.09 |
| 5,473,550 | 12/1995 | Cameron et al. | 364/571.01 |
| 5,510,939 | 4/1996 | Lewis | 360/78.09 |
| 5,592,346 | 1/1997 | Sullivan | 360/77.04 |

*Primary Examiner*—W. Chris Kim
*Assistant Examiner*—Dan I. Davidson
*Attorney, Agent, or Firm*—Kinney & Lange, P.A.

[57] ABSTRACT

A method for adjusting the frequency response of a servo loop is provided that positions a servo head at a nominal position over a medium and determines the frequency response of the servo loop. A compensation gain is determined at the nominal position such that when the compensation gain is combined with the servo loop's frequency response, the compensation gain causes the frequency response to approach a desired frequency response. In addition, a servo loop and a disc drive with such compensation gain are provided.

20 Claims, 8 Drawing Sheets

FREQUENCY DOMAIN HEAD LINEARIZATION

This application claims the priority benefit of a provisional U.S. patent application having application No. 60/029,064, filed on Oct. 22, 1996.

BACKGROUND OF THE INVENTION

The present invention relates to servo loops in information storage devices. In particular, the present invention relates to the frequency response and linearity table of a servo loop used to position a head over a recording medium.

In an information storage device, such as a disc drive, a servo loop is often used to position a recording or reading head over a medium. The servo loop typically includes an actuator that moves the head in response to a command signal. The command signal is generated by servo logic within the servo loop and is based on a control signal from a host and a position signal from the head. The control signal represents the host's desired position for the head and the position signal represents the current location of the head over the medium. Ideally, the command signal should move the head from its current position towards the desired position.

Before the servo loop can function in this manner, the relationship between the position signal and the actual position of the head over the medium must be recorded within the servo logic. This allows the servo logic to determine the actual position of the head based upon position signals later produced by the head. Ideally, the relationship between the head's actual position and the position signal is linear across a track such that a change in position results in a proportional change in the position signal and the proportionality between the actual position and the position signal remains constant across the track. In practice, the relationship between the actual position and the position signal is not constant; it varies depending on the position of the head. These variations not only make it difficult to determine the actual position of the head from the position signal but also cause the frequency response of the servo loop to vary depending on the position of the head.

A disc drive's frequency response represents its ability to respond to changing input signals. The frequency response of the disc drive is generally controlled by the servo loop and can be defined in terms of a servo loop gain, which represents the servo loop's response to an input signal, and a crossover frequency, which is the frequency at which the gain drops to one. The servo loop gain can be measured by taking the ratio of a first servo loop signal to a second servo loop signal, where the two signals are taken from opposite sides of a point where an external input signal is introduced into the loop.

The frequency response of the servo loop is affected by non-linearities in the relationship between actual head position and the position signal because one factor that affects the overall gain of the servo loop is the amount of change produced in the position signal when the head's actual position changes. Thus, because of variations in the relationship between actual head position and the position signal the overall servo loop gain varies across a track. Since the servo loop gain determines the frequency response of the servo loop, variations in the gain cause position dependent variations in the servo loop's frequency response.

Prior art systems have attempted to minimize the problems associated with these variations by using a laser to precisely measure the position of the head on the track while recording the value of the position signal. The actual position measured by the laser and the recorded value of the position signal are stored in a table that contains entries for a number of positions across each track. The table, known as a linearity table, is stored in a memory location within the servo logic when the storage device is activated and is accessed by the servo logic while the servo loop attempts to position the head. The linearity table allows the servo logic to compensate for non-linearities in the relationship between actual head position and the position signal. The table thereby allows the servo logic to more accurately position the head.

Although the process of taking such laser measurements is fairly accurate, it is also time consuming. This makes it undesirable because it increases the time and cost of producing a disc drive. In addition, it does not fully address variations in the frequency response of the servo loop because it does not measure the frequency response of the servo loop. The present invention provides solutions to these and other problems, and offers other advantages over the prior art.

SUMMARY OF THE INVENTION

In the present invention, a servo loop's frequency response is adjusted to improve its consistency. The method uses a nominal position table to initially position the head within a track. At a plurality of nominal positions across the track, the crossover frequency of the servo loop is determined. A compensation gain is added to the gain of the servo loop to cause the crossover frequency to match a desired crossover frequency. The respective compensation gain is added to the servo loop's frequency response to adjust the frequency response.

Embodiments of the present invention include two different methods for determining the compensation gain required at each track position. In one method, the difference between the actual crossover frequency and a desired crossover frequency is multiplied by a conversion factor to produce a proposed change in the compensation gain. This proposed change is added to an existing compensation gain to produce a new compensation gain, which is used in the servo loop to produce a new crossover frequency. The difference between the new crossover frequency and the desired crossover frequency is once again multiplied by the conversion factor to produce a new proposed change in the compensation gain. This iterative process is repeated as many times as desired depending on the amount of time available to repeat the iteration and the amount of accuracy desired in the compensation gain.

A second method for determining the compensation gain measures the servo loop gain at the desired crossover frequency. The difference between the servo loop gain at the desired crossover frequency and the desired crossover gain is multiplied by a conversion factor to produce a proposed change in the compensation gain. This proposed change is added to the existing compensation gain and is applied to the servo loop. This iterative process is repeated several times until the desired frequency response is obtained.

In preferred embodiments, a compensation gain table is produced that relates nominal position to compensation gain. This table is used to make the frequency response of the servo loop more consistent at all positions across the track. This, by itself, creates an advantage in the present invention over the prior art. Further advantages are realized in other preferred embodiments by converting the compensation gain table into a scaled linearity table. In one embodiment, is accomplished by integrating the compensation gain table and fitting the product of the integration to the nominal linearity table at two positions. Once the scaled linearity table is fit to the nominal linearity table, it provides a more accurate representation of the relationship between the position signal and the actual position of the head.

These and various other features as well as advantages which characterize the present invention will be apparent upon reading of the following detailed description and review of the associated drawings.

DETAILED DESCRIPTION

Figure 1:
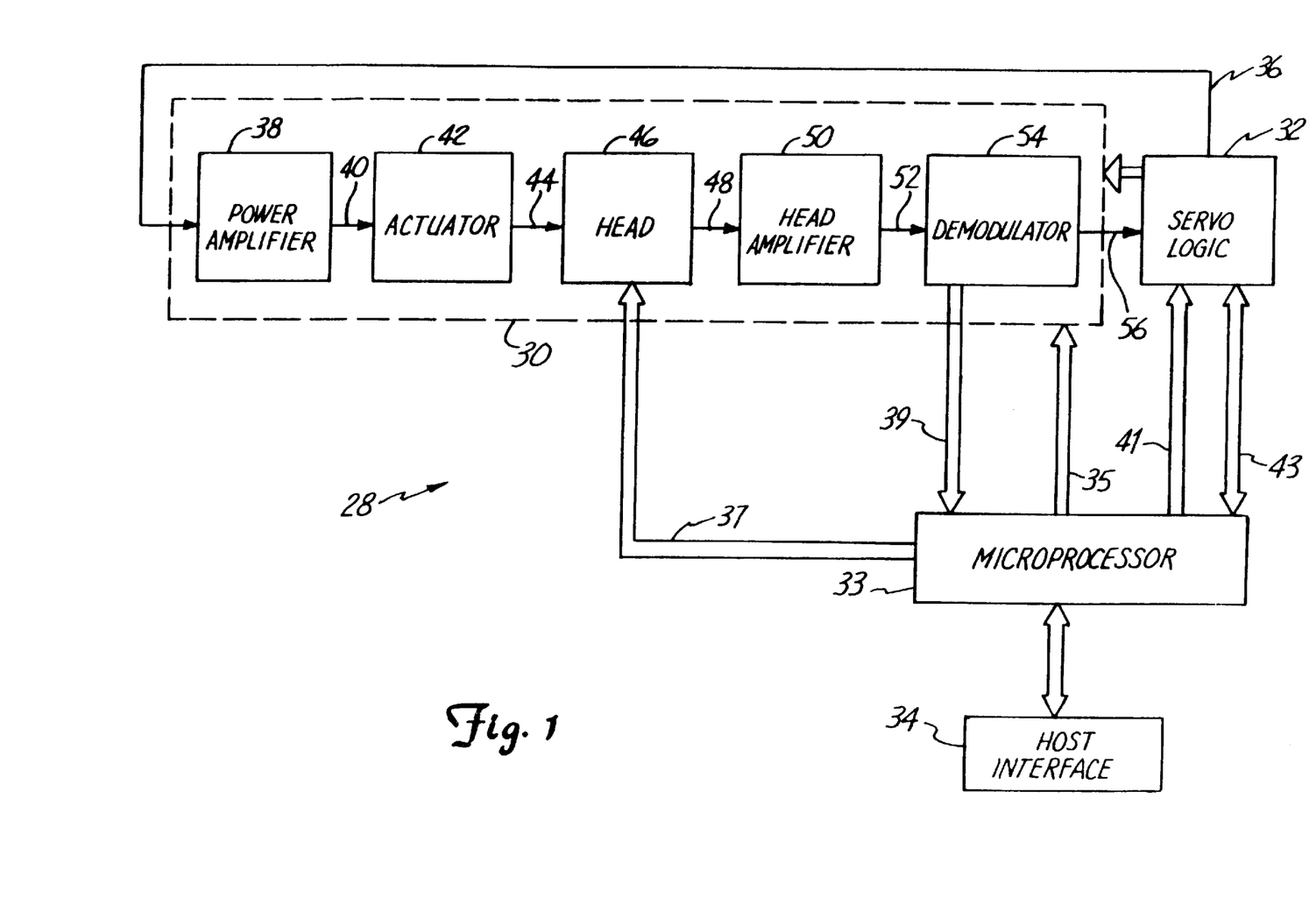
FIG. 1 is a block diagram of an information storage device of the present invention.

FIG. 1 is a block diagram of an information storage device 28, such as a magnetic disc drive. Storage device 28 includes three main components: plant 30, servo logic 32, and microprocessor 33. Microprocessor 33 communicates with a host (not shown) through a host interface 34. Microprocessor 33 controls the reading and writing of information to a disc based on instructions received from the host. Specifically, microprocessor 33 applies control signals through control lines 35 to plant 30 to control various functions of plant 30 including selection of a head, strength of a write current, read sensitivity and mode of operation (read, write, or track seek). In addition, microprocessor 33 provides write data along data bus 37 to a head 46 in plant 30 so that the head may write the data to the disc. Data read by the head is recovered by plant 30 and provided to microprocessor 33 along data bus 39. The recovered data is provided to the host through host interface 34.

Microprocessor 33 controls the movement of head 46 over the disc through servo logic 32, which is connected to microprocessor 33 through an address bus 41 and a bi-directional data bus 43. Using address bus 41 and data bus 43, microprocessor 33 is able to store a desired location for the head in a memory location within servo logic 32. This memory location is accessed by servo logic 32, which issues a current command 36 to plant 30 based upon the stored value and the current position of the head. Microprocessor 33 is also able to retrieve head position information stored in servo logic 32's memory locations using address bus 41 and data bus 43.

Within plant 30, current command 36 is received by power amplifier 38, which converts the voltage of current command 36 into a current signal 40. Current signal 40 is provided to and controls an actuator 42, which includes a voice coil motor that is driven by, and accelerates at a rate determined by, the current of current signal 40. Actuator 42 translates the current of current signal 40 into mechanical movement 44, which moves head 46 relative to the medium.

Head 46 detects data and servo patterns embedded within the medium as it moves relative to the medium. The servo patterns contain information about the position of the head relative to the medium and cause the head to produce a low level signal 48 that contains encoded position information. A head amplifier 50 amplifies the low level signal 48 to produce amplified signal 52, which is less susceptible to noise and which is easier to decode. Amplified signal 52 is input to demodulator 54, which interprets the encoded head signal and supplies a demodulator position measurement 56 to servo logic 32, and data to microprocessor 33. Servo logic 32 applies demodulator position measurement 56 to a linearity table that relates the demodulator position measurement 56 to the actual position of the head. Thus, servo logic 32 can determine the position of head 46 and issue a new current command 36 based on this position and the desired position set by microprocessor 33.

There are two basic modes of operation for storage device 28. In one mode, known as track seeking, microprocessor 33 instructs servo logic 32 to move the head across the medium to a new track. In the second mode of operation, known as track following, microprocessor 33 instructs servo logic 32 to keep the head located over a position within a track. Track following is not a completely passive mode since servo logic 32 must move the head in order to keep it steady relative to a track on the medium. This movement is necessary because the tracks include irregularities and head 46 must move in order to follow these irregularities. During track following, the head is kept in position using the servo loop formed between plant 30 and servo logic 32. Specifically, as head 46 moves off position, low level signal 48 begins to change because the head is reading different parts of the servo patterns embedded in the medium. This change in low level signal 48 causes similar changes in amplified signal 52 and position measurement 56. In response to the change in position measurement 56, servo logic 32 changes current command 36 so that head 46 moves towards its original position over the track.

The servo loop described above has a frequency dependent response due to irregularities in the track in the sense that its ability to respond to irregularities in the track decreases as the frequencies of those irregularities increases. In this sense, the irregularities of the track can by thought of as an input signal to the servo loop. For certain types of head 46, specifically magnetoresistive heads, the frequency response of the servo loop changes as the position of head 46 changes within a track. Thus, the head will respond faster to track irregularities in different parts of a track.

To determine the frequency response of the servo loop, an embodiment of the present invention inserts disturbance signals into the servo loop to see how the servo loop responds to different frequencies. In one embodiment of the present invention, shown in FIG. 2, these disturbances are added to the servo loop by a personal computer that is connected to the information storage device for this purpose. The elements of FIG. 2 that are found in FIG. 1 are referred to using the same characters used in FIG. 1.

Figure 2:
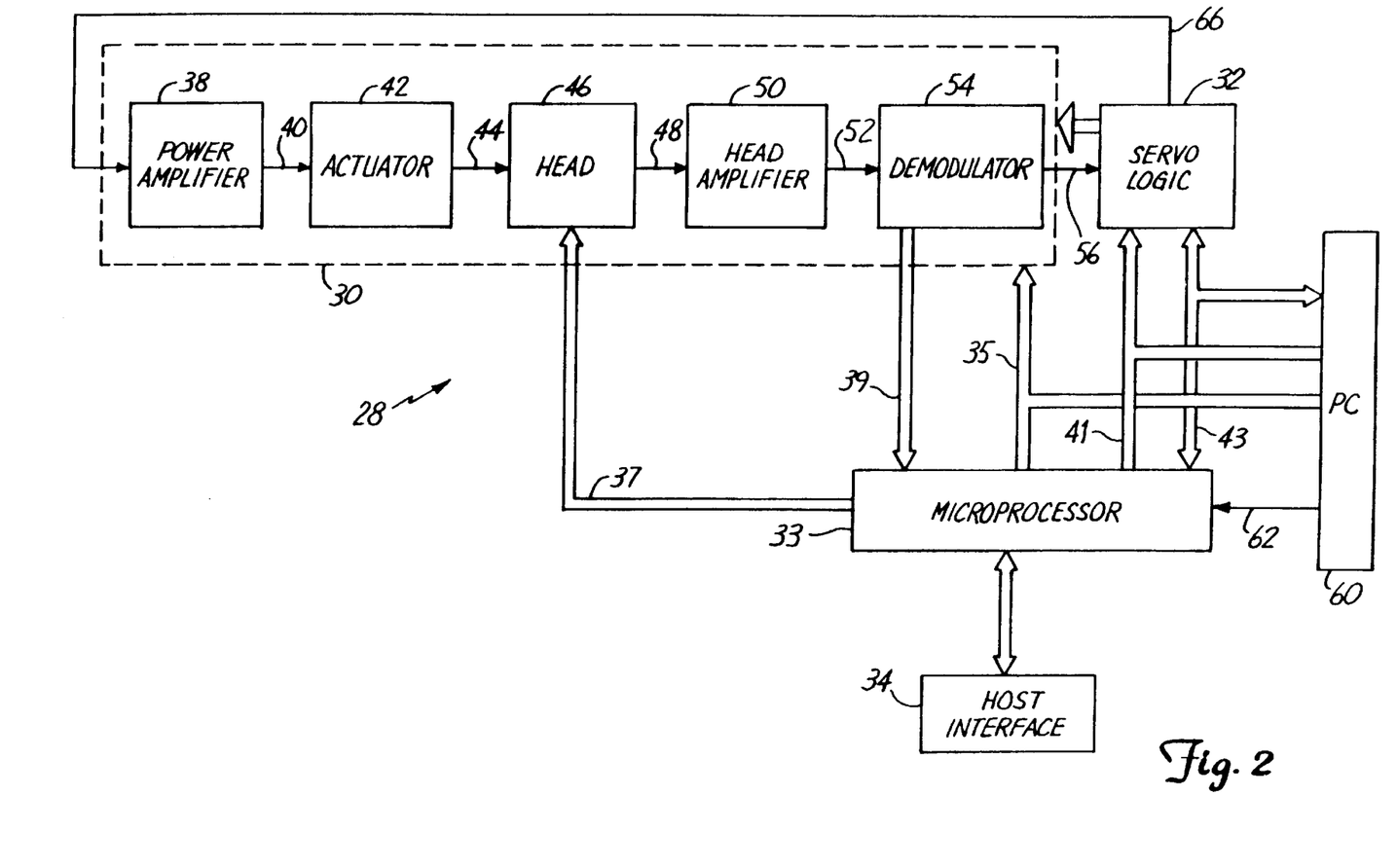
FIG. 2 is a block diagram of an information storage device connected to a personal computer to determine compensation gain.

In FIG. 2, personal computer (PC) 60 is added to information storage device 28 of FIG. 1 and is connected to address bus 41 and bidirectional data bus 43 between microprocessor 33 and servo logic 32. Through these connections, PC 60 is able to read values stored in servo logic 32, including the value of position measurement 56. PC 60 is also able to read the value of a signal that is equivalent to current command 36 of FIG. 1. In FIG. 2, the signal referred to as current command 36 in FIG. 1 is not directly output to power amplifier 38. Instead, the value of this signal is stored in a memory location within servo logic 32 and is accessed by PC 60. During frequency testing, PC 60 combines the stored current command value with the value of a sinusoidal disturbance signal to produce a net current command value, which is then stored in servo logic 32. A series of these values is used to create net current command 66, which is output by servo logic 32 to power amplifier 38.

In preferred embodiments, address bus 41 and data bus 43 are each 8-bit buses and servo logic 32 includes a 16-bit digital signal processor. Therefore, in order to retrieve or store values, PC 60 must perform two separate operations. For instance, the position measurement value stored in servo logic 32 is a 16-bit value, so PC 60 must perform two separate 8-bit read functions in order to retrieve a single position measurement from servo logic 32.

PC 60 is also connected to plant 30 through control lines 35, and is able to control plant 30 in a manner similar to the way in which microprocessor 33 controls plant 30. In order to avoid a conflict with microprocessor 33 while PC 60 is operating, PC 60 issues a "sleep" command to microprocessor 33 along a disable line 62. The "sleep" command disables microprocessor 33 so that microprocessor 33 does not issue commands to plant 30 while PC 60 is interacting with storage device 28.

PC 60 includes an input/output card that allows a standard personal computer to communicate with the servo system. The input/output card converts addresses generated by PC 60 into the addressing scheme used by servo logic 32 and plant 30. Preferably, the card allows a single eight bit value to be written to or read from servo logic 32 in less than two microseconds.

Figure 3:
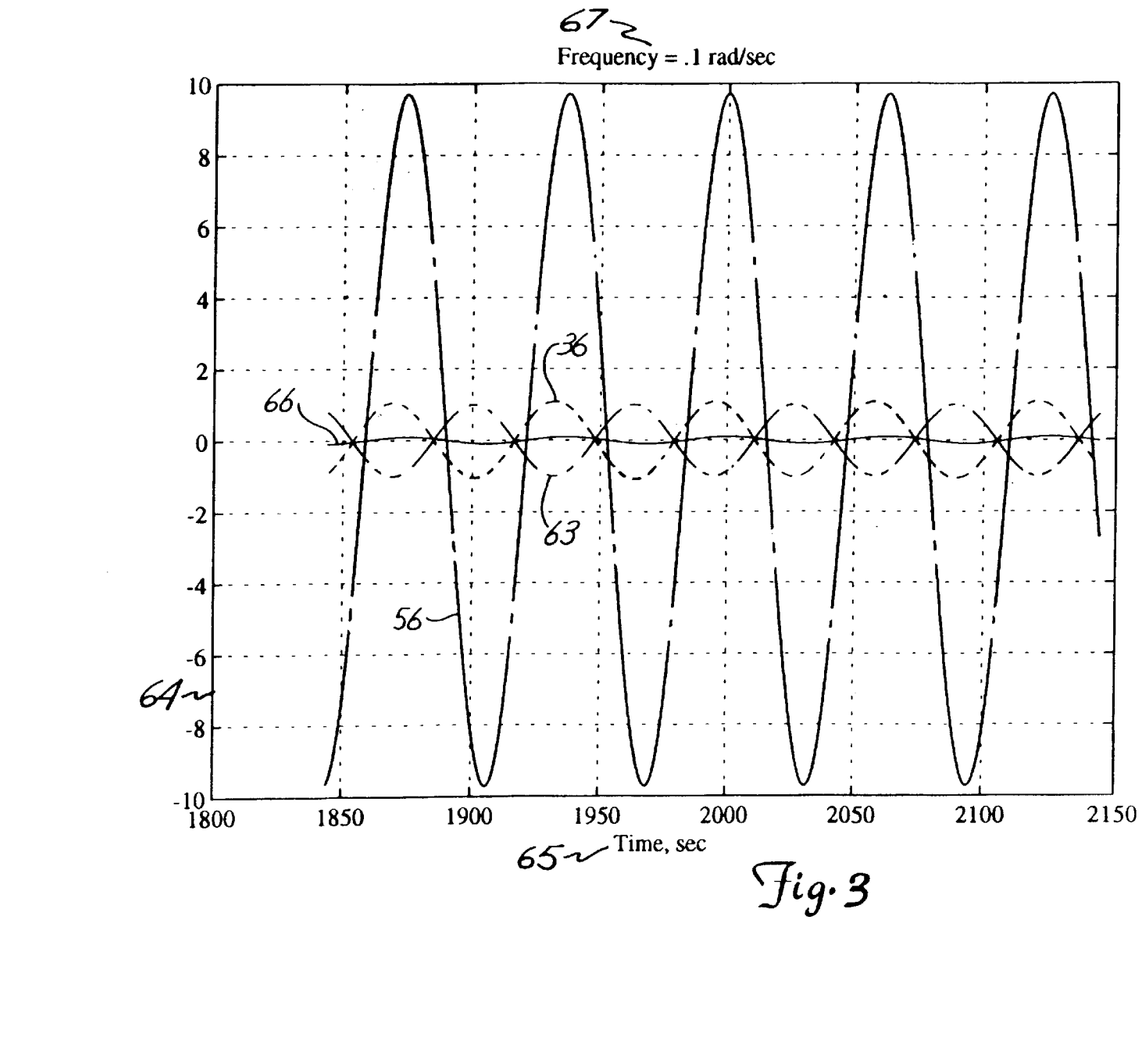
FIG. 3 is a composite graph of four signals in the servo loop at low frequency.

FIG. 3 is a composite graph of four signals in the servo loop formed by plant 30, servo logic 32, and PC 60 of FIG. 2. The signals represent the response of the servo loop to a fixed sinusoidal disturbance signal 63. The magnitude of the signals have been scaled so that the vertical axis, 64, is in arbitrary units. The scaling performed on each signal is designed to permit a comparison between the signals of FIGS. 3 and 4, which show the same signals at different frequencies. The horizontal axis of FIG. 3 is time, 65, measured in seconds.

In FIG. 3, disturbance signal 63 is the sinusoidal signal that PC 60 combines with current command 36 to produce net current command 66, which is output to power amplifier 38. In FIG. 3, all three signals have a frequency 67 of 0.1 radians per second. Current command 36 has the same amplitude as disturbance signal 63 but is slightly more than 180° out of phase with disturbance signal 63. Net current command 66 has a small magnitude that causes the head to move and creates a sinusoidal demodulator position measurement 56. This in turn creates current command 36 through servo logic 32.

Since current command 36 can be thought of as the servo loop's response to net current command 66, the gain of the servo loop can be measured as the ratio of the magnitude of current command 36 to the magnitude of net current command 66. As can be seen from FIG. 3, at this low frequency, the ratio of current command 36 to net current command 66 is greater than 1.

Figure 4:
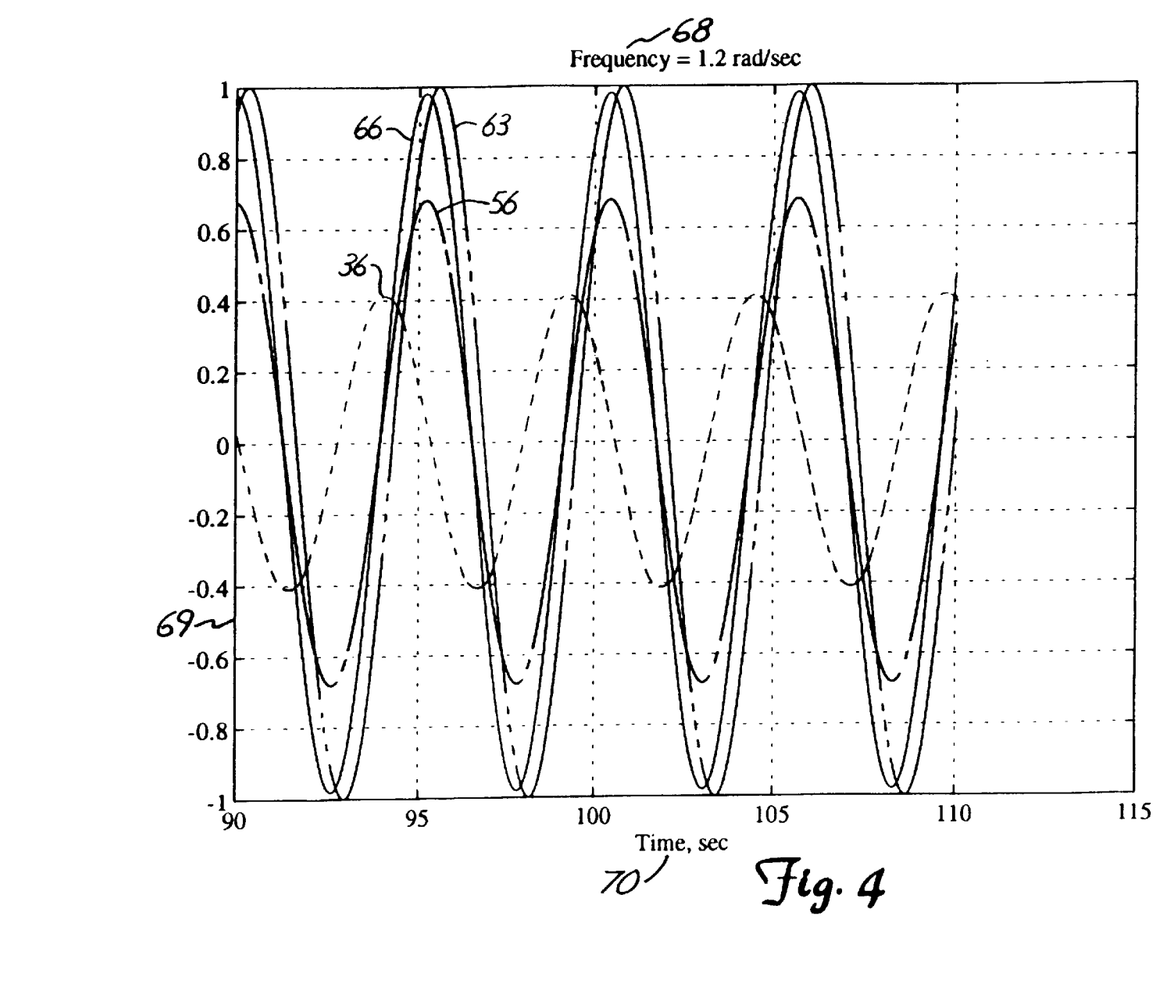
FIG. 4 is a composite graph of four signals in the servo loop at high frequency.

FIG. 4 shows a composite graph of the four signals of FIG. 3 but with disturbance signal 63 at a higher frequency. Specifically, disturbance signal 63 has a frequency 68 of 1.2 radians per second in FIG. 4. As in FIG. 3, the vertical axis, 69, is in arbitrary units and the horizontal axis represents time, 70, in seconds. The magnitude of disturbance signal 63 in FIG. 4 is the same as in FIG. 3. The frequency of disturbance signal 63 is such that the servo loop cannot respond quickly enough to compensate for the signal. As such, current command 36 is smaller in FIG. 4 than in FIG. 3 and net current command 66 is larger in FIG. 4 than in FIG. 3. As such, the ratio of current command 36 to net current command 66 is much smaller in FIG. 4, and in fact is less than 1 in FIG. 4. Thus, as the frequency of the disturbance signal increases, the gain of the servo loop generally decreases.

Figure 5:
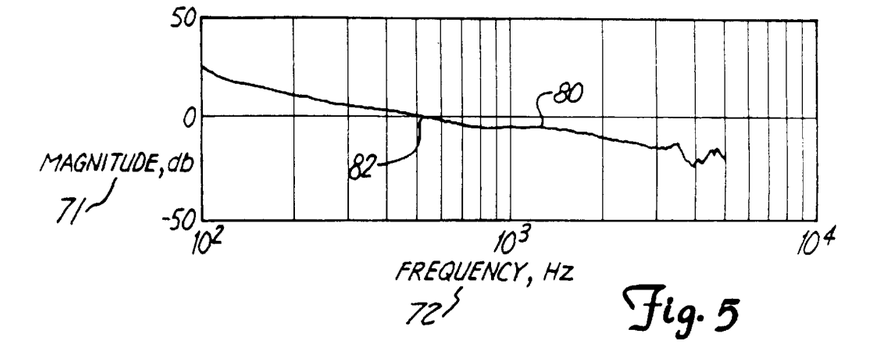
FIG. 5 is the open loop frequency response of the servo loop of FIG. 1.

The decreasing gain is shown more clearly in FIG. 5, which is a graph of the open loop frequency response of a servo loop such as the one shown in FIG. 2. In FIG. 5, line 80 denotes the magnitude of the gain as a function of frequency, 72, measured in Hertz (1/sec) denoted as Hz along the horizontal axis. The magnitude, 71, shown on the vertical axis in FIG. 5 is measured in decibels (db) such that a gain of magnitude 1 is depicted as a gain of 0 db. Point 82 is the point at which the open loop gain crosses 0 db. The frequency associated with point 82 is known as the crossover frequency for the servo loop.

The frequency response shown in FIG. 5 is for a head located near a single track position. At other track positions, the servo loop's frequency response will be different.

In the present invention, PC 60 of FIG. 2 is used to set a number of compensation gain values in a compensation gain table stored in servo logic 32. The compensation gain values reduce variations in the frequency response of the servo loop as the head is moved to different positions along the track. Specifically, the compensation gain values shift the respective frequency responses, such as the one shown in FIG. 5, up or down so that there is less variation between the various frequency responses. This greatly improves the consistency of positioning the head using the servo loop.

Figure 6:
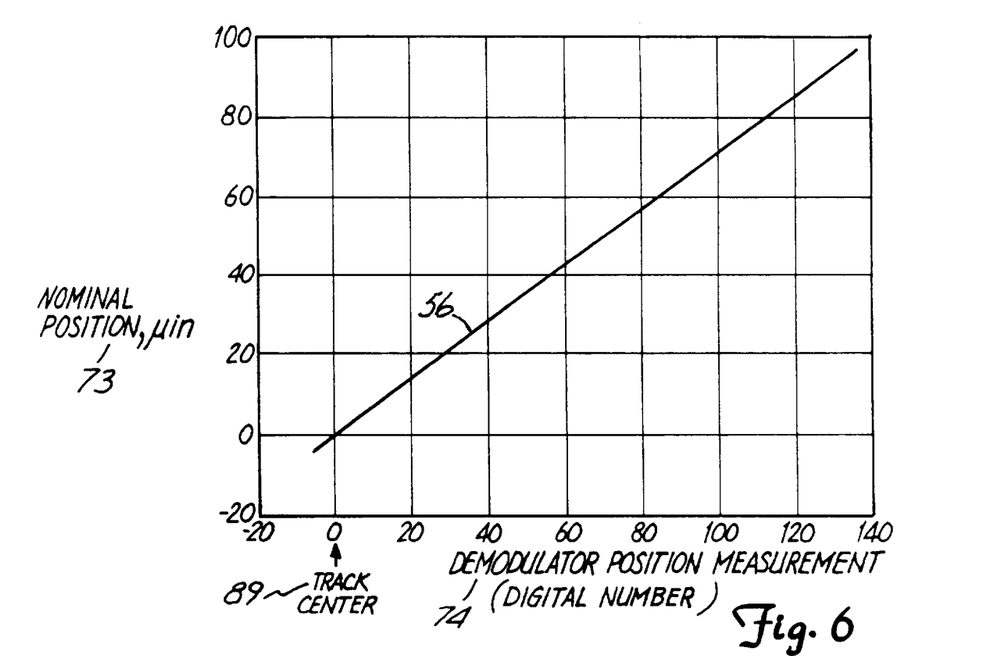
FIG. 6 is a graph of nominal position versus position measurement.

To determine the compensation gain needed at different positions along a track, the head must first be nominally placed at each position. This can be accomplished using a nominal linearity table that associates a demodulator position measurement 56 with a nominal position within a track. FIG. 6 shows a nominal linearity table for ½ of a track.

The nominal linearity table of FIG. 6 shows nominal positions, 73, in micro-inches along the vertical axis and demodulator position measurements, 74, along the horizontal axis. The table is created by assigning a demodulator position measurement of zero, track center 89, to a nominal position of zero and the maximum value of the demodulator position measurement to a nominal position of ½ a track width, which in FIG. 6 is 90.5 micro inches. The remainder of the nominal linearity table is then produced by connecting the two assigned positions with a straight line. The nominal linearity table can be stored in a memory associated with microprocessor 33 and provided to servo logic 32 when the system is first activated.

The possible demodulator position measurements for each half of a track can be divided into 128 nominally even spaced offsets. At each offset, the present invention determines the compensation gain required to make the frequency response of the servo loop more consistent across the track width.

Figure 7:
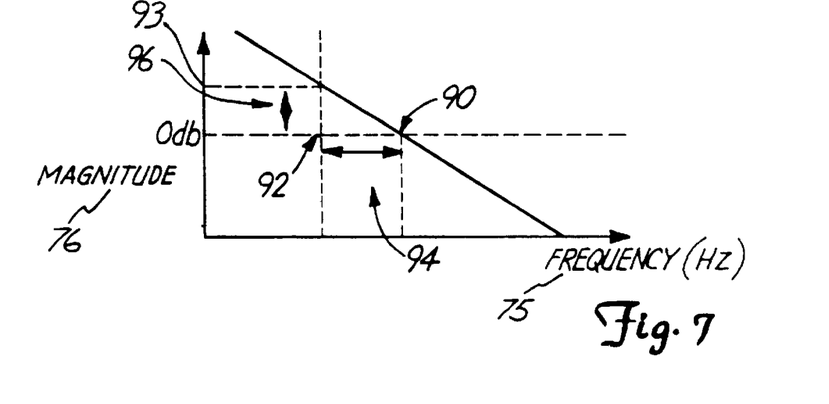
FIG. 7 is a simplified open loop frequency response for a servo loop.

FIG. 7 is a simplified version of a servo loop's open-loop frequency response that is useful in describing the present invention's method for determining compensation gain at a particular offset. In FIG. 7, frequency, 75, is shown in hertz along the horizontal axis and magnitude, 76, is shown in decibels along the vertical axis. The frequency response of the servo loop has a measured crossover point 90 and a desired crossover point 92. Desired crossover point 92 represents the crossover point for the target frequency response that the present invention wishes to obtain at all track offsets. The frequency difference between measured crossover point 90 and desired crossover point 92 is denoted as frequency difference 94 in FIG. 7. The magnitude of the measured gain at the frequency of desired crossover point 92 is denoted as magnitude 93 and the difference between magnitude 93 and 0 db is denoted as magnitude difference 96. Both frequency difference 94 and magnitude difference 96 may be used in separate methods to obtain the compensation gain needed to modify the frequency response so that it approaches the desired frequency response.

In both methods, PC 60 multiplies the respective difference, either frequency difference 96 or magnitude difference 94, by a respective conversion constant to produce a proposed change in the compensation gain. This change in gain is added to the existing compensation gain, which initially has a value of 0 db. The sum of the existing compensation gain and the change in compensation forms a new compensation gain, which is applied to servo logic 32 to produce a new frequency response for the servo loop. This new frequency response should have a crossover point that is closer to the desired crossover point 92. By repeating this process, the compensation gain will continue to change so that the frequency response approaches the desired frequency response. However, there will be diminishing returns in the improvement of the frequency response and at some point further iterations will not greatly improve the frequency response.

The rate at which the frequency response approaches the desired frequency response is determined by the chosen conversion factor. In general, large conversion factors cause the frequency response to change fast but also increase the chances that the frequency response will oscillate around the desired response.

Figure 8:
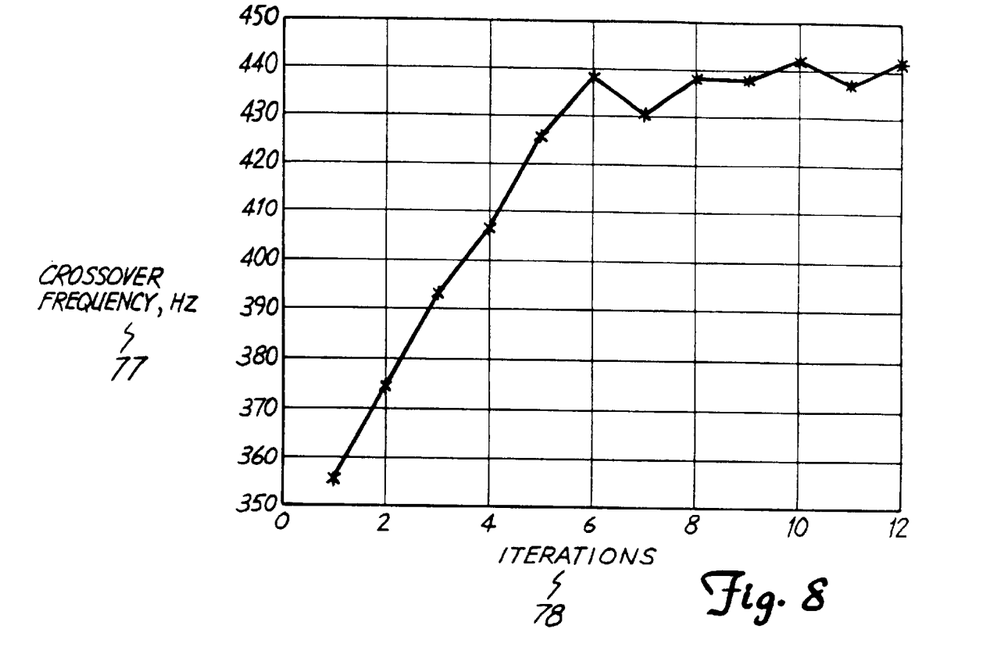
FIG. 8 is a graph of crossover frequency as a function of iterations in approximating compensation gain.

FIG. 8 shows changes in the frequency, 77, of the measured crossover point 90 as a function of iterations, 78, of the method described above. As can be seen from FIG. 8, the crossover frequency increases dramatically for the first six iterations but then quickly levels off. By the tenth iteration, there is very little change in the crossover frequency and the crossover frequency is merely oscillating around 440 Hz. In general, between ten and twelve iterations is sufficient to obtain the proper compensation gain for the desired frequency response.

Figure 9:
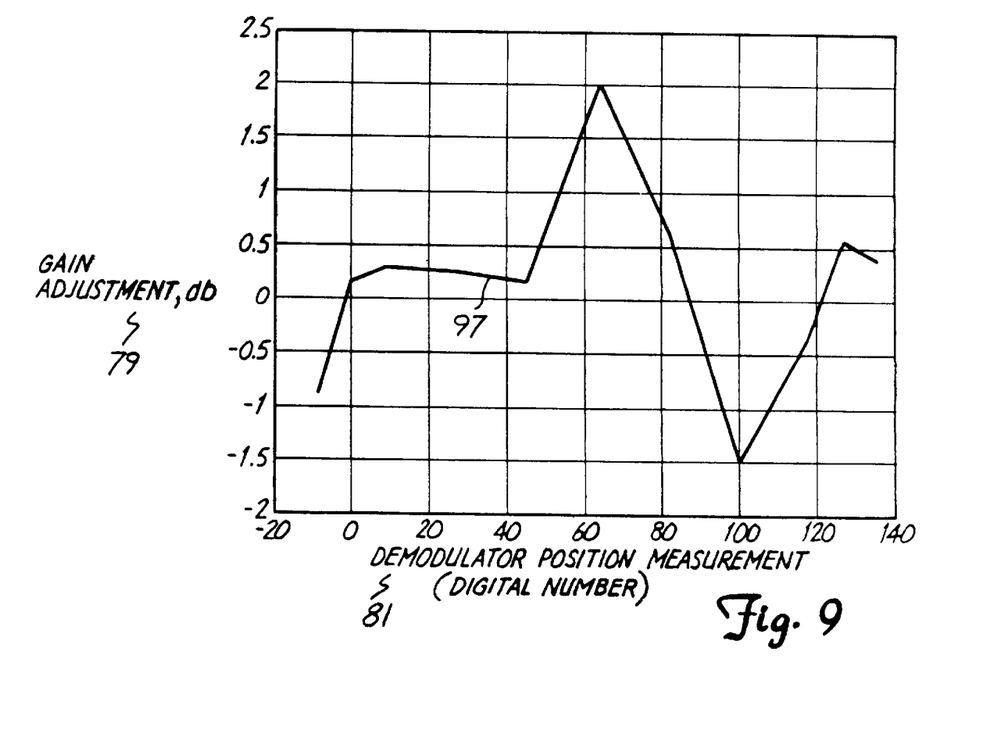
FIG. 9 is a graph of compensation gain as a function of track position.

The process of determining compensation gain is repeated at each offset. A graph of the compensation gains for each offset across half a track is shown in FIG. 9 with gain adjustments, 79, shown in decibels along the vertical axis and demodulator position measurements, 81, shown along the horizontal axis. In FIG. 9, the plurality of compensation gains 97 can be either positive or negative and may have a variety of values across half of a track.

It would be possible to use this table alone in the drive to normalize the frequency response of the servo loop. This can be accomplished by building a table based on the graph of FIG. 9 and storing the table in servo logic 32 when the system is activated. Servo logic 32 could then apply the required compensation gain from the table based upon the offset determined by servo logic 32. However, this table alone would not give an accurate depiction of the position of the head for a given demodulator position measurement 56. It would only provide a consistent servo loop frequency response across a track.

Figure 10:
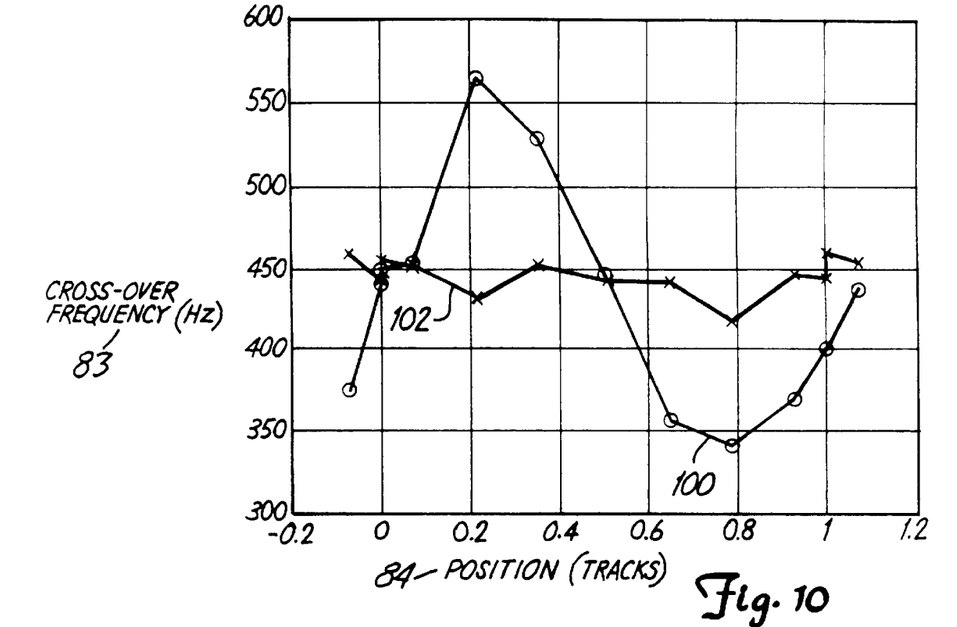
FIG. 10 is a composite graph of crossover frequency as a function of track position for compensated and uncompensated servo loops.

The improvements in the consistency of the frequency response achieved through the present invention are shown in FIG. 10, where crossover frequencies 83 are plotted as a function of track position 84. Line 100 is a graph of the crossover frequencies for a servo loop that does not use compensation gain values. Line 102 is a graph of crossover frequencies for a servo loop that uses a compensation gain graph such as the one shown in FIG. 9. As can be seen in FIG. 10, the use of a compensation gain table greatly normalizes the crossover frequency across a track. This is beneficial since it improves the consistency of the servo loop at all positions across the track.

In addition to improving the consistency of the servo loop's frequency response, the compensation gain graph of FIG. 9 can be used to create a more accurate linearity table, which more accurately describes the relationship between the demodulator position measurement 56 and the actual position of the head over a track. The compensation gain can be used to obtain this more accurate linearity table because the compensation gain is largely compensating for deviations from the ideal linearity table.

Specifically, changes in the frequency response of the servo loop can largely be attributed to changes in the relationship between demodulator position measurement 56 and the movement of the head. Ideally, at all positions on the track, a fixed change in the position of the head should produce a consistent change in the demodulator position measurement. In other words, a small change in the position of the head at one track offset should produce the same amount of change in the demodulator position measurement that is produced by an identical change in position of the head at a separate offset. Thus, ideally, if distance is denoted as "x" and the demodulator position measurement is denoted as "p", then dx/dp represents the ratio of a small change in distance over the resultant small change in the demodulator position measurement, and this ratio should be constant across the track. However, because of non-linearities found in some heads, especially magnetoresistive heads, dx/dp is not constant. Instead, it changes as the head moves to different positions on a track.

These changes are largely responsible for the changes in the frequency response of the servo loop. As such, when the compensation gain normalizes the frequency response of the servo loop, it is actually compensating for changes in dx/dp. For instance, when dx/dp is larger than the ideal dx/dp, the head is producing a demodulator position measurement that is smaller than expected for a given change in the position of the head. Without compensation gain, this would result in a lower magnitude servo loop gain and a lower crossover frequency. In order to compensate for the low servo loop gain, a large compensation gain must be used. Thus, when dx/dp is large, the compensation gain of the present invention is also large. In fact, the compensation gain is proportional to dx/dp.

In light of this, it is possible to obtain the relationship between the actual position of the head and the demodulator position measurement by integrating the compensation gain across the demodulator position measurement. In terms of equations:

$$\frac{dx}{dp} = A \cdot K \qquad \text{Eq. (1)}$$

Where "x" is actual position, "p" is demodulator position measurement, "A" is a proportionality constant, and "K" is the compensation gain.
Therefore:

$$dx = A \cdot K \cdot dp \qquad \text{Eq. (2)}$$

$$\int dx = A \int K \cdot dp \qquad \text{Eq. (3)}$$

The integration of Equation 3 can be accomplished using stepwise integration. Temporarily ignoring the proportionality constants, each step in the stepwise integration can be represented by:

$$X_I = X_{I-1} + (P_I - P_{I-1}) \cdot K_I \qquad \text{Eq. (4)}$$

Where "$X_I$" is the actual position of the head for the Ith demodulator position measurement, "$X_{I-1}$" is the actual position of the head for the (I−1) demodulator position measurement, "$P_I$" is the demodulator position measurement for the Ith demodulator position measurement, "$P_{I-1}$" is the demodulator position measurement for the (I−1) demodulator position measurement, and "$K_I$" is the compensation gain at the Ith demodulator position measurement. In the stepwise integration, $X_0$ and $P_0$ are both equal to zero. Through this stepwise integration, a value for the actual position of the head is determined for each of the demodulator position measurements.

While this integration provides the general shape of the curve for the linearity table, it is meaningless by itself because it ignores the proportionality constant "A" and the constants of integration. These constants can be accounted for by fitting the result of the stepwise integration to the ideal linearity table at two points. This fitting is accomplished by forcing the integrated values to intersect the ideal linearity graph at the center of the track (demodulator position measurement zero) and at the edge of the track (demodulator position measurement 127).

The set of actual position values, $X_I$, obtained through the integration can be fit to the ideal linearity table to produce scaled linearity values, $S_I$, by using the following equation:

$$S_I = X_I \cdot P + Q \qquad \text{Eq. (5)}$$

Where:

$$P = \frac{Y_{127} - Y_0}{X_{127} - X_0}; \qquad \text{Eq. (6)}$$

and $$Q = Y_0 - (P \cdot X_0) \qquad \text{Eq. (7)}$$

In Equations 6 and 7, $X_0$ equals the value of the stepwise integration at demodulator position measurement 0; $X_{127}$ equals the value of the stepwise integration at demodulator position measurement 127; $Y_0$ equals head position at demodulator position measurement 0 in the ideal linearity table; and $Y_{127}$ equals head position at demodulator position measurement 127 in the ideal linearity table.

Figure 11:
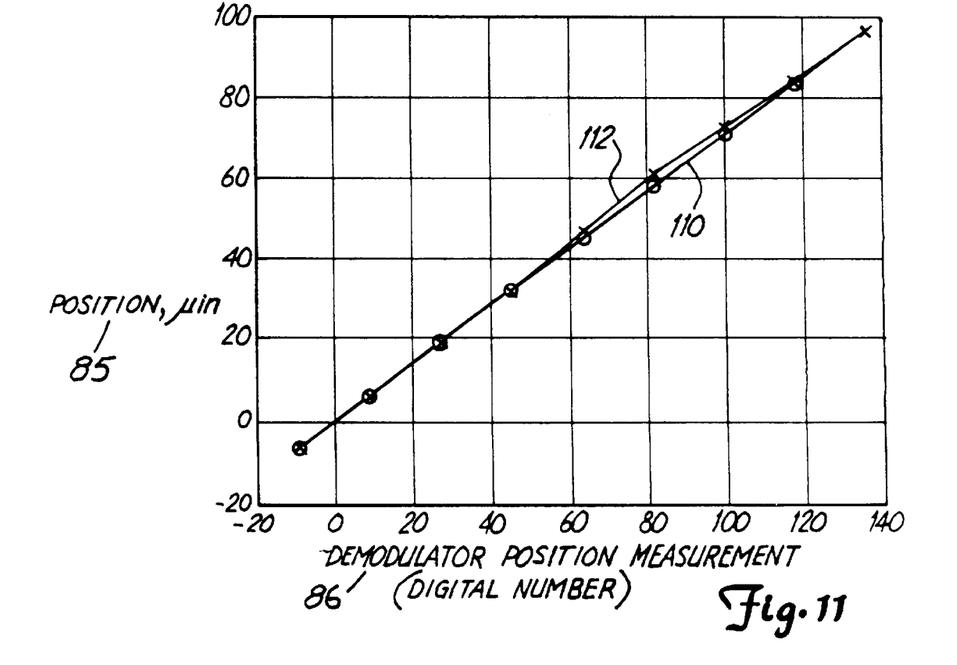
FIG. 11 is a composite graph of a scaled linearity table and a nominal linearity table.

An example of integrated position values that have been fit to an ideal linearity graph is shown in FIG. 11 which is a composite of an ideal linearity graph 110 and a scaled linearity graph 112 with position, 85, along the vertical axis and demodulator position measurement, 86, along the horizontal axis. Scaled linearity graph 112 does not have a constant slope. Instead the slope of the scaled linearity graph changes at different positions along the track because of non-linearities in the head. As such, scaled linearity graph 112 provides a more accurate depiction of the actual position of the head for a given demodulator position measurement.

Although fitting the integrated position values to the ideal linearity table makes it possible to more accurately determine the position of the head for a given demodulator position measurement, it also causes a reduction in the consistency of the servo loop's frequency response. This occurs because the process of fitting the graph to the ideal graph changes the compensation gain represented by the graph. However, although fitting the graph makes the servo loop's frequency response less consistent across the track, the consistency of a servo loop's frequency response using a scaled linearity table is still better than the frequency response of servo loops that merely use ideal linearity tables.

Figure 12:
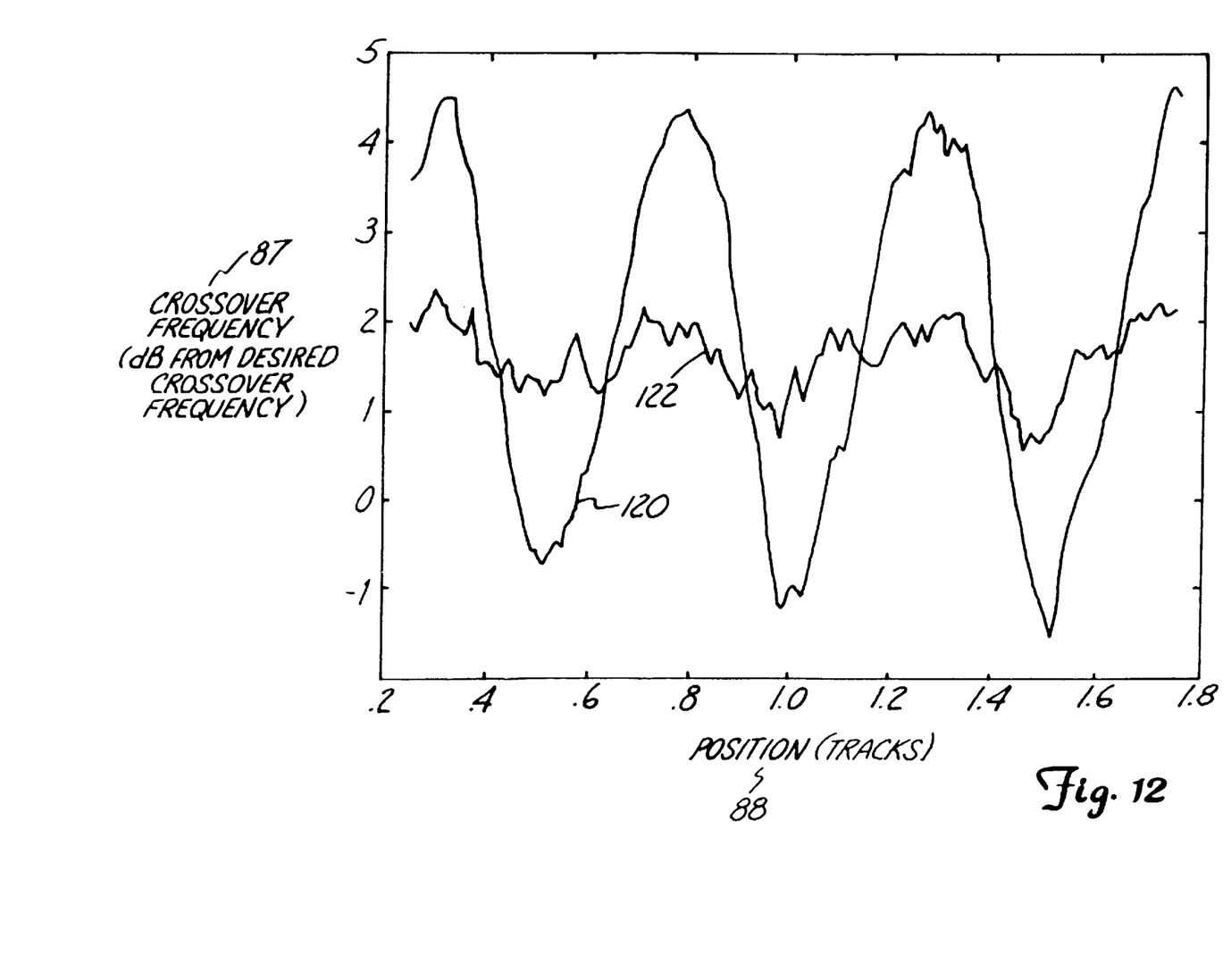
FIG. 12 is a composite graph of crossover frequency as a function of track position for a compensated servo loop after fitting to produce the linearity table and an uncompensated servo loop.

FIG. 12 is a composite of crossover frequencies, 87, at selected track positions, 88, for two different servo loops. Crossover frequencies, 87, are shown in terms of deviations from a desired crossover frequency. The deviations are measured in decibels (dB), with the desired crossover frequency at zero decibels. Graph 120 depicts the crossover frequencies for a servo loop using a nominal, or ideal, linearity table. Graph 122 depicts the crossover frequencies for a servo loop using a scaled linearity table. As can be seen from FIG. 12, the variations in the crossover frequency are much smaller for the scaled linearity graph 122 than for the nominal linearity graph 120.

As discussed above, the present invention is a method and servo system that utilizes frequency domain recording and read head linearization to improve the positioning of a servo head over a recording medium. The linearization is achieved using compensation gain 79 which is determined at a plurality of position measurement signals 81 to produce a plurality of compensation gain values 97. Each compensation gain value of the plurality of compensation gain values 97, is used to adjust a servo loop gain, which is equal to the ratio of a first signal 36 to the sum 66 of the first signal 36 and an externally generated input signal 63.

The plurality of compensation gain values 97 can be determined using two different methods. In a first method the frequency difference 94 between an actual or present crossover frequency 90 and a desired crossover frequency 92 is multiplied by a constant to arrive at a proposed change in the compensation gain value. The proposed change in the compensation gain value is added to a present compensation gain value to produce a new compensation gain value. In a second method, the gain difference 96 between a present servo loop gain 93 at a desired crossover frequency 92 and a desired crossover gain at that frequency is multiplied by a conversion factor or constant to arrive at a change in compensation gain value that is added to an existing compensation gain value to produce a new compensation gain value.

The plurality of compensation gain values 97 can be used to determine an actual head position 85 from a position measurement signal 86. In preferred embodiments, the plurality of compensation gain values 97 are integrated to form a scaled linearity table 112 that is fit to a nominal linearity table 110. Scaled linearity tables 112 permit the present invention to more accurately determine the position of the recording head relative to a recording medium.

Although the present invention has been described with reference to preferred embodiments, workers skilled in the art will recognize that changes may be made in form and detail without departing from the spirit and scope of the invention. For example, although the processes of determining compensation gain and of creating the linearity table were described using an external personal computer connected to servo logic 32, it is possible to program microprocessor 33 so that it performs these functions without the external personal computer. The program used by microprocessor 33 may be stored in an area of flash memory that can be written over once the compensation gain table and scaled linearity table have been generated.

What is claimed is:

1. A method for adjusting the frequency response of a servo loop having a servo head, the method comprising:

positioning the servo head at a nominal position over a track on a medium;

determining a present frequency response of the servo loop at the nominal position;

determining a compensation gain from the servo loop's frequency response, the compensation gain such that when it is combined with the present servo loop frequency response it causes the resulting servo loop frequency response to approach a predetermined servo loop frequency response; and combining the present servo loop frequency response and the compensation gain to provide an adjusted servo loop frequency response.

2. The method of claim 1 wherein a compensation gain is determined for each of a plurality of position measurement signals representing positions over the medium to produce a plurality of compensation gain values.

3. The method of claim 1 wherein the method of determining compensation gain comprises:

determining a present crossover frequency based on a present compensation gain;

determining a frequency difference between a desired crossover frequency and the present crossover frequency;

multiplying the frequency difference by a conversion factor to obtain a proposed change in the compensation gain; and adding the proposed change in the compensation gain to the present compensation gain to produce a new compensation gain.

4. The method of claim 3 wherein the method of determining compensation grain is repeated, with each repetition using the new compensation gain obtained in the previous determination of compensation gain as the present compensation gain.

5. The method of claim 1 wherein the method of determining compensation gain comprises:

determining a present servo loop gain at a desired crossover frequency based on a present compensation gain;

determining a gain difference between the present servo loop gain and a desired crossover gain;

multiplying the gain difference by a conversion factor to obtain a proposed change in compensation gain; and adding the proposed change in compensation gain to the present compensation gain to produce a new compensation gain.

6. The method of claim 5 wherein the method of determining compensation gain is repeated, with each repetition using the new compensation gain obtained in the previous determination of compensation gain as the present compensation gain.

7. The method of claim 2 further comprising using the plurality of compensation gain values to determine an actual head position from a position measurement signal.

8. The method of claim 7 wherein the method of using the plurality of the compensation gain values to determine an actual head position from a position measurement signal comprises integrating the compensation gain values across their respective position measurement signals to produce products of integration.

9. The method of claim 8 wherein in the method of using the plurality of compensation gain values to determine an actual position from a position measurement signal further comprises fitting the products of integration to a nominal position table, the nominal position table nominally correlating position measurement signals to positions within a track.

10. A servo system for positioning a servo head relative to a recording medium, the servo system comprising:

an actuator connected to the servo head for moving the servo head in response to a current command;

a transducer, formed in the servo head, for producing a head signal based upon the position of the servo head over the recording medium;

a demodulator, operatively coupled to the transducer, for producing a demodulator output in response to the transducer's head signal; and a servo logic circuit, coupled to the demodulator, for producing a current command partially in response to the demodulator output and partially in response to compensation gain values that are based on corresponding servo loop crossover frequencies and are stored in a memory arrangement therein according to positions of the servo head with respect to the recording medium from which memory arrangement such values can repeatedly be selectively retrieved.

11. The servo system of claim 10 wherein determination of a compensation gain value is determined by the servo system with a gain adjuster coupled therewith provided for:

placing the head at a nominal position over the medium;

determining an actual open-loop gain crossover frequency;

multiplying the difference between the actual open-loop gain crossover frequency and a desired open-loop gain crossover frequency by a constant to arrive at a change in compensation gain value; and adding the change in compensation gain value to an existing compensation gain value to produce a new compensation gain value.

12. The servo system of claim 10 wherein determination of a compensation gain value is determined by the servo system with a gain adjuster coupled therewith provided for:

placing the head at a nominal position over the medium;

determining an open-loop gain at a crossover frequency;

multiplying the difference between the open loop gain and a desired open loop gain at the crossover frequency by a constant to arrive at a change in compensation gain value; and adding the change in compensation gain value to an existing compensation gain value to produce a new compensation gain value.

13. The servo system of claim 10 wherein the servo circuit is capable of using a scaled linearity table to determine a position of the head over the recording medium, the scaled linearity table formed by integrating compensation gain values.

14. The servo system of claim 13 wherein the scaled linearity table is further based on fitting two points in the scaled linearity table to a nominal linearity table.

15. A disc drive having a sensor head in a servo loop to provide sense signals therein which servo loop also receives desired locations for the head from a position location source for directing an actuator therein to position the head at a plurality of positions across a track on a medium, the servo loop being configured through a gain adjuster coupled therewith that provides a corresponding servo loop frequency response parameter adjustment for each of the plurality of positions of the head across a track so that there is a respective crossover frequency for the servo loop such that the ratio of a corresponding first signal in the servo loop, obtained at least in part from a sense signal, to the sum of the first signal in the servo loop and a corresponding externally generated input signal received by the servo loop is equal to one when the first signal and the externally generated input signal have a frequency equal to the corresponding selected crossover frequency, the respective crossover frequencies such that all of the respective crossover frequencies are within aband of frequencies less than 400 Hz wide.

16. The disc drive of claim 15 wherein a compensation gain is present in the servo loop.

17. The disc drive of claim 16 wherein an initial compensation gain is produced at each of the plurality of positions by the servo loop and the gain adjuster that is provided for:

determining an actual ratio of the first signal to the sum of the first signal and the externally generated input signal at a crossover frequency;

subtracting one from the actual ratio to produce a difference; and multiplying the difference by a constant to produce an initial compensation gain.

18. The disc drive of claim 17 wherein a refined compensation gain is produced by the servo loop and the gain adjuster that is provided for:

using the initial compensation gain in the servo loop to determine a refined actual ratio of the first signal to the sum of the first signal and the externally generated input signal at the crossover frequency;

subtracting one from the refined actual ratio to produce a refined difference;

multiplying the refined difference by a constant to produce a change in compensation gain; and adding the change in compensation ain to the initial compensation gain.

19. The disc drive of claim 16 further comprising a scaled linearity table stored in memory locations within the servo loop, which is based on a plurality of compensation gains and is capable of providing an indication of actual head position across a track.

20. The disc drive of claim 19 wherein the scaled linearity table is fit to a nominal linearity table at two positions across a track.

* * * * *

UNITED STATES PATENT AND TRADEMARK OFFICE
CERTIFICATE OF CORRECTION

PATENT NO. : 6,072,654
DATED : JUNE 6, 2000
INVENTOR(S) : KYLE KENNETH EDDY

It is certified that error appears in the above-identified patent and that said Letters Patent is hereby corrected as shown below:

Col. 13, line 4, before "circuit", insert -- logic --

Col. 13, line 30, delete "aband", insert -- a band --

Col. 14, line 24, delete "ain", insert -- gain --

Signed and Sealed this

Seventeenth Day of April, 2001

Attest:

NICHOLAS P. GODICI

*Attesting Officer*     *Acting Director of the United States Patent and Trademark Office*